Jan. 10, 1956  E. W. REES  2,730,147

MEAT GRINDER AND SAFETY ATTACHMENT THEREFOR

Filed Aug. 16, 1952

Inventor
Earl W. Rees

United States Patent Office 2,730,147
Patented Jan. 10, 1956

---

2,730,147

MEAT GRINDER AND SAFETY ATTACHMENT THEREFOR

Earl W. Rees, Norwalk, Calif.

Application August 16, 1952, Serial No. 304,705

4 Claims. (Cl. 146—182)

My invention relates to meat grinders and more particularly to the grinder worm member, the cone housing therefor and the safety attachment for the oval bowl.

Manifestly an object of my invention is to provide a cone shaped feed worm mounted in a cone housing, said housing being so arranged whereby the same may be easily adjusted over said feed worm, so that the wearing edges of the flutes and vanes of the respective parts may be easily adjusted, and thereby preventing clogging of the feed worm, prevents the meat discoloration because of heat elimination during meat grinding operation and also providing an even meat grinding process because the excessive pressure is entirely eliminated.

Another object of my invention is to provide said feed worm with a variable pitch feed flute, and thereby when in operation, allowing the meat or portions thereof to be fed at a rate which coincides with the flow allowed by the pitch flute and during the turning action of said worm, thereby eliminating excessive pressure at the discharge end of said meat grinder, prevents mashing and churning of the meat fibre and allowing the meat or portions thereof to travel at a uniform speed during the processing operation.

A further object of my invention is to provide said feed worm in shape of a cone which is adjustably mounted within a suitable cone housing, and thereby eliminating feed worm wabble, excessive wear of the flutes and vanes of the respective parts so that the life of the grinder may be prolonged.

Another object of my invention is to provide the bowl of said meat grinder with a safety guard and thereby preventing injury to the operator of said grinder when feeding meat into the throat of the bowl, or when cleaning the same, and to prevent injury to the operator when the motor of said grinder is turned on accidentally.

My invention also has for its objects to provide such means which are simple in construction, easily assembled of the working parts and easily dismantled when required, and further providing for means of great superiority and serviceability.

Other and further objects and advantages of my invention as will hereinafter more fully appear, I attain by the construction herein shown on the drawings and described in the specification, forming a part of my application.

Reference is had to the accompanying drawings, in which the similar reference characters denote the same parts.

Figure 1:
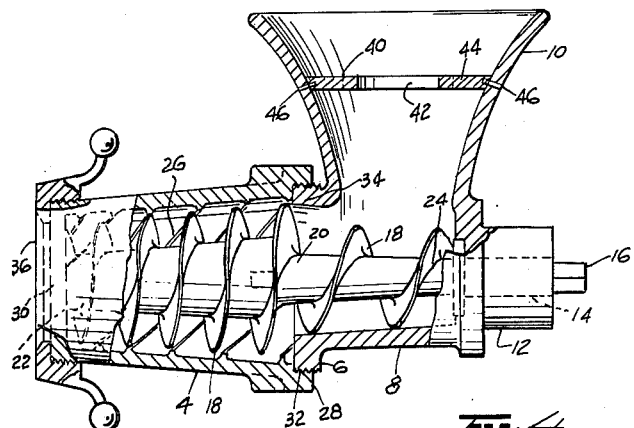
Fig. 1 shows a partly elevational and partly sectional view of the meat grinder.
Figure 2:
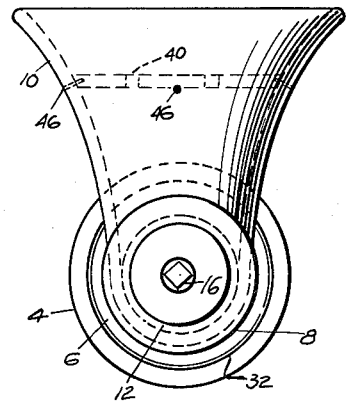
Fig. 2 shows the end elevational view thereof, taken from the right of Fig. 1.
Figure 4:
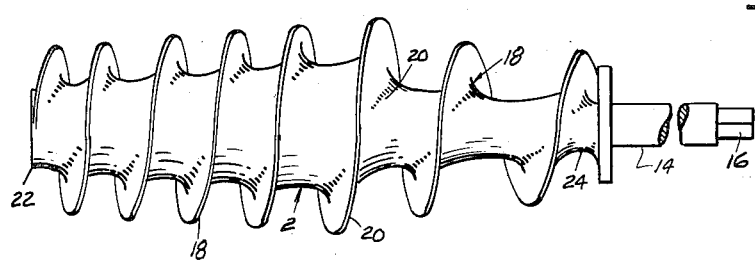
Fig. 4 shows an enlarged side elevational view of the feed worm.
Figure 5:
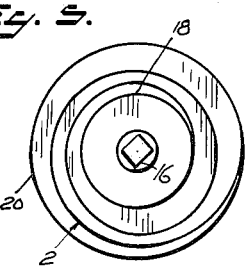
Fig. 5 shows the end view thereof, taken from the right of Fig. 4.

Describing my invention more in detail, said invention comprises a conical worm 2 mounted within a cone housing 4 which is adjustably secured to a mounting end section 6 of a bowl body 8, the upper section of which terminates with an oval bowl member 10.

Said bowl body member 8 is provided with a suitable bearing member 12 adapted for retaining the shaft end 14 of said worm 2, the end of said shaft end 14 being provided with a squared end section 16 for providing driving means when attached and connected to a suitable drive coupling (not shown) when said meat grinder is attached to a driving motor and placed in operation.

Said conical worm 2 is provided with a continuous flute or rib member 18 having a mid-section 20 from which said flute member 18 extends at a variable conical pitch toward the front end 22, and also having a variable pitch conical flute member 18 of a small diameter, which extends to the rear end 24 and terminating with said shaft end 14, hereinbefore mentioned.

Figure 6:
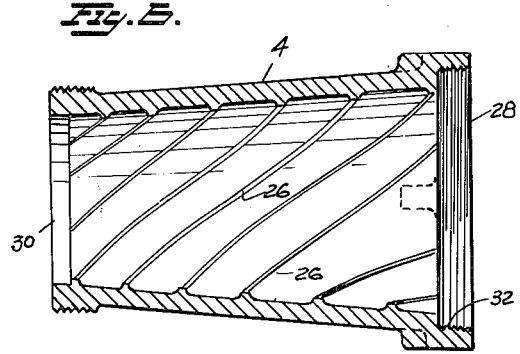
Fig. 6 is a longitudinal sectional view of the cone housing, taken on the line 6—6 of Fig. 7.
Figure 7:
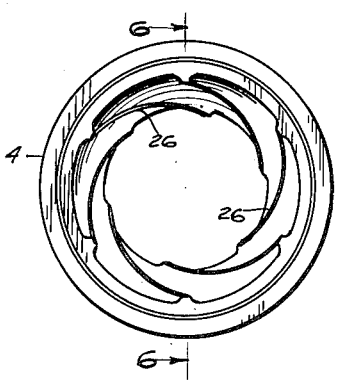
Fig. 7 shows an enlarged end elevational view thereof, taken from the right of Fig. 6.
Figure 3:
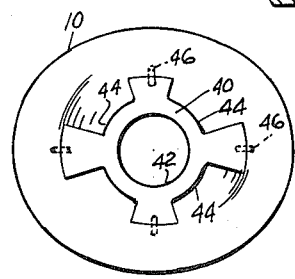
Fig. 3 shows the top plan view of the meat grinder bowl showing the safety attachment in position.

Said cone housing 4 is also provided with a plurality of vanes 26, extending at a variable pitch from the mounting end section 28 toward the front end 30, as shown in Fig. 6, the purpose of which will be presently described.

The mounting end member 28 is provided with suitable thread section 32 which is adapted for mounting said housing 4 upon a companion flange 34, of said bowl body member 8, also allowing an endwise adjustment over said flute member 18 of said conical worm 2, so that said flute member 18 and said vanes 26 may be held in proper alignment and position.

When in operation, said flute 18 of said rear end 24 feeds meat into the mid-section 20 and then forcing said meat into the front end 22 and the cutter assembly 36, as shown in Fig. 1, the variable pitch of said vanes 26 and said flute 18 allowing said meat to pass at a uniform speed thus preventing over-heating of the material passing therethrough, which also prevents meat discoloration, clogging up of the worm, and allows even meat grinding because the excessive pressure is eliminated.

In order to provide a safety feature in said meat grinder, the upper section of said bowl member 10 is provided with a spider member 40, having a center opening 42 and a set of passages 44, said spider member being held in place and position by means of pins 46, as shown.

When in use, meat in small sections or portions is fed through said opening 42 and said passages 44, thus preventing the operator of the meat grinder from injury to his fingers, and also preventing injury when said meat grinder is cleaned and the motor is accidentally put in operation.

While I have thus described my invention with great particularity, it will be clear that the same may be modified throughout the entire range. I accordingly do not propose to be limited to the exact details of construction herein shown and described, but reserve the rights in practice to make the necessary changes and modifications therein, which may come within the scope of the appended claims.

I claim as my invention:

1. In a meat grinder of the class described, comprising a bowl member and a bowl body, a conical worm revolubly mounted in said bowl body having the smaller extremity thereof projecting from said bowl body, a complementary cone housing mounted over the extended end of said conical worm, and means in said cone housing for mounting said housing in an adjustable position and to said bowl body.

2. In a meat grinder of the class described, comprising a bowl member and a bowl body, a conical worm having variable flute pitch revolubly mounted in said bowl body having the smaller extremity thereof projecting from said bowl body, and a complementary cone housing having a plurality of vanes of variable pitch and mounted over the extended end of said conical worm, and means in said bowl body and said cone housing for holding said cone housing in an adjustable position over said conical worm.

3. In a meat grinder of the class described comprising a bowl member and a bowl body, a conical worm having variable pitch flute revolubly mounted in said bowl body having the smaller extremity thereof projecting from said bowl body, a complementary cone housing having a plurality of variable pitch vanes adjustably mounted over the extended end of said conical worm, and a safety spider in the upper section of said bowl member for preventing injury to the operator and the user of said meat grinder.

4. In a meat grinder of the class described, as disclosed in claim 3, wherein opening and passages are provided in said safety spider for feeding parts and portions of meat therethrough, and means in said safety spider for removing the same from its mounted position.

References Cited in the file of this patent

UNITED STATES PATENTS

| 1,889,688 | Middleton | Nov. 29, 1932 |
| 2,001,793 | McArdle et al. | May 21, 1935 |

FOREIGN PATENTS

| 515,578 | Great Britain | Dec. 8, 1939 |